US 7,957,129 B2

(12) United States Patent
Watanabe

(10) Patent No.: US 7,957,129 B2
(45) Date of Patent: Jun. 7, 2011

(54) DISPLAY DEVICE

(75) Inventor: Osamu Watanabe, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/634,411

(22) Filed: Dec. 9, 2009

(65) Prior Publication Data

US 2010/0085698 A1    Apr. 8, 2010

Related U.S. Application Data

(62) Division of application No. 11/951,088, filed on Dec. 5, 2007, now Pat. No. 7,660,106.

(30) Foreign Application Priority Data

Dec. 7, 2006    (JP) ................................. 2006-331196

(51) Int. Cl.
*H05K 7/12*    (2006.01)
(52) U.S. Cl. ......... 361/679.22; 361/679.21; 361/679.27; 248/917; 16/339; 16/337
(58) Field of Classification Search ............... 361/679.3, 361/679.06, 679.26, 679.56, 679.08, 679.09, 361/679.21, 679.02, 679.58, 679.01, 679.27, 361/679.05, 679.07; 248/917–924; 455/575.1–575.4; 16/339, 337; 379/433.11–433.13
See application file for complete search history.

(56) References Cited

U.S. PATENT DOCUMENTS

| | | | |
|---|---|---|---|
| 5,771,540 A | 6/1998 | Carpenter et al. | |
| 6,427,288 B1 | 8/2002 | Saito | |
| 6,459,887 B2 * | 10/2002 | Okuda | 455/90.1 |
| 6,568,034 B2 * | 5/2003 | Cho | 16/337 |
| 6,788,539 B2 * | 9/2004 | Skofljanec | 361/719 |
| 6,789,292 B2 | 9/2004 | Oshima et al. | |
| 6,828,756 B2 | 12/2004 | Kinoshita | |
| 7,380,313 B2 | 6/2008 | Akiyama et al. | |
| 7,418,279 B2 | 8/2008 | Takagi | |
| 2001/0052167 A1 | 12/2001 | Cho | |
| 2003/0061684 A1 | 4/2003 | Tanaka et al. | |
| 2003/0221288 A1 | 12/2003 | Kim et al. | |

FOREIGN PATENT DOCUMENTS

EP    1 300 599 A2    4/2003

(Continued)

OTHER PUBLICATIONS

Japanese Office Action dated Jan. 27, 2009, and English translation thereof issued in counterpart Japanese Application No. 2006-331196.
Extended European Search Report dated Jun. 16, 2009 (7 pages), issued in counterpart European Application Serial No. 07021201.4.

(Continued)

*Primary Examiner* — Jayprakash N Gandhi
*Assistant Examiner* — Ingrid Wright
(74) *Attorney, Agent, or Firm* — Patterson & Sheridan, LLP

(57) ABSTRACT

A supporting mechanism movably supports a display body, a display surface of which is in the vertical position and in an inclined position. A pressing mechanism has an elastic member which stores repulsive force by being pressed by the display body as the display body moves from the vertical position to the inclined position, and presses the display body by the repulsive force in the direction from the inclined position to the vertical position. A position holding mechanism holds the display body at an optional position anywhere between the vertical position and the inclined position.

12 Claims, 14 Drawing Sheets

FOREIGN PATENT DOCUMENTS

| | | |
|---|---|---|
| JP | 07-168530 A | 7/1995 |
| JP | 2005-108201 A | 4/2005 |
| JP | 2005-137521 A | 6/2005 |
| JP | 2005-207442 A | 8/2005 |
| JP | 2005-208080 A | 8/2005 |

OTHER PUBLICATIONS

Chinese Office Action dated Jun. 5, 2009 and partial English translation thereof issued in counterpart Chinese Application No. 2007101962846.

* cited by examiner

DISPLAY DEVICE

CROSS REFERENCE TO RELATED APPLICATION

The present application is a Divisional Application of U.S. application Ser. No. 11/951,088 filed Dec. 5, 2007 now U.S. Pat. No. 7,660,106, which is based on Japanese Priority Document P2006-331196 filed on Dec. 7, 2006, the contents of both of which are incorporated herein by reference.

BACKGROUND OF THE INVENTION

1. Field of the Invention

The present invention relates to a display device whose display body having a display surface is capable of tilting.

2. Discussion of the Background

Conventionally, as disclosed in the Japanese Laid-Open publications Hei 07-168530, 2005-137521, and 2005-207442, for example, there is a display device whose display body having a display surface on which information is displayed is capable of tilting. Such display device allows the display body to move from a position where the display surface of which is in the vertical position to a position where the display surface of which is in a inclined position. Also, the display device is capable of holding the display body at an optional position. The display body starts to move by loading its housing, and so on.

Here, in order to hold the display body of the display display device at an optional position as described above, if the display device has a heavier display body, stronger holding power is required.

However, when the holding power for holding the display body is strengthened, a load, which is required to start the movement of the display body, should be stronger. This might be a great burden for a user of the display device.

SUMMARY OF THE INVENTION

An object of the present invention is to provide a display device capable of starting the movement of the display body by a relatively small load.

To achieve the object of the present invention, a display device of the prevent invention is provided which includes: (i) a display body having a display surface which displays information, at one surface side, (ii) a supporting mechanism for supporting the display body movable around a supporting axis provided at a lower end of the display body at a vertical position where the display surface is in the vertical position and at an inclined position where the display surface is in the inclined position, (iii) a pressing mechanism having an elastic member for storing repulsive force by being pressed by the display body as the display body moves from the vertical position to the inclined position, and for pressing the display body by the repulsive force of the elastic member in the direction from the inclined position to the vertical position, and (iv) a position holding mechanism having a first contact member for contacting the display body and a second contact member for pressing the first contact member in an axis direction of the supporting axis, and for holding the display body at an optional position between the vertical position and the inclined position by contact friction generated between the first contact member and the second contact member due to the pressing by the second contact member to the first contact member.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

A first embodiment of the present invention will be explained with reference to FIGS. 1 to 13.

Figure 1:
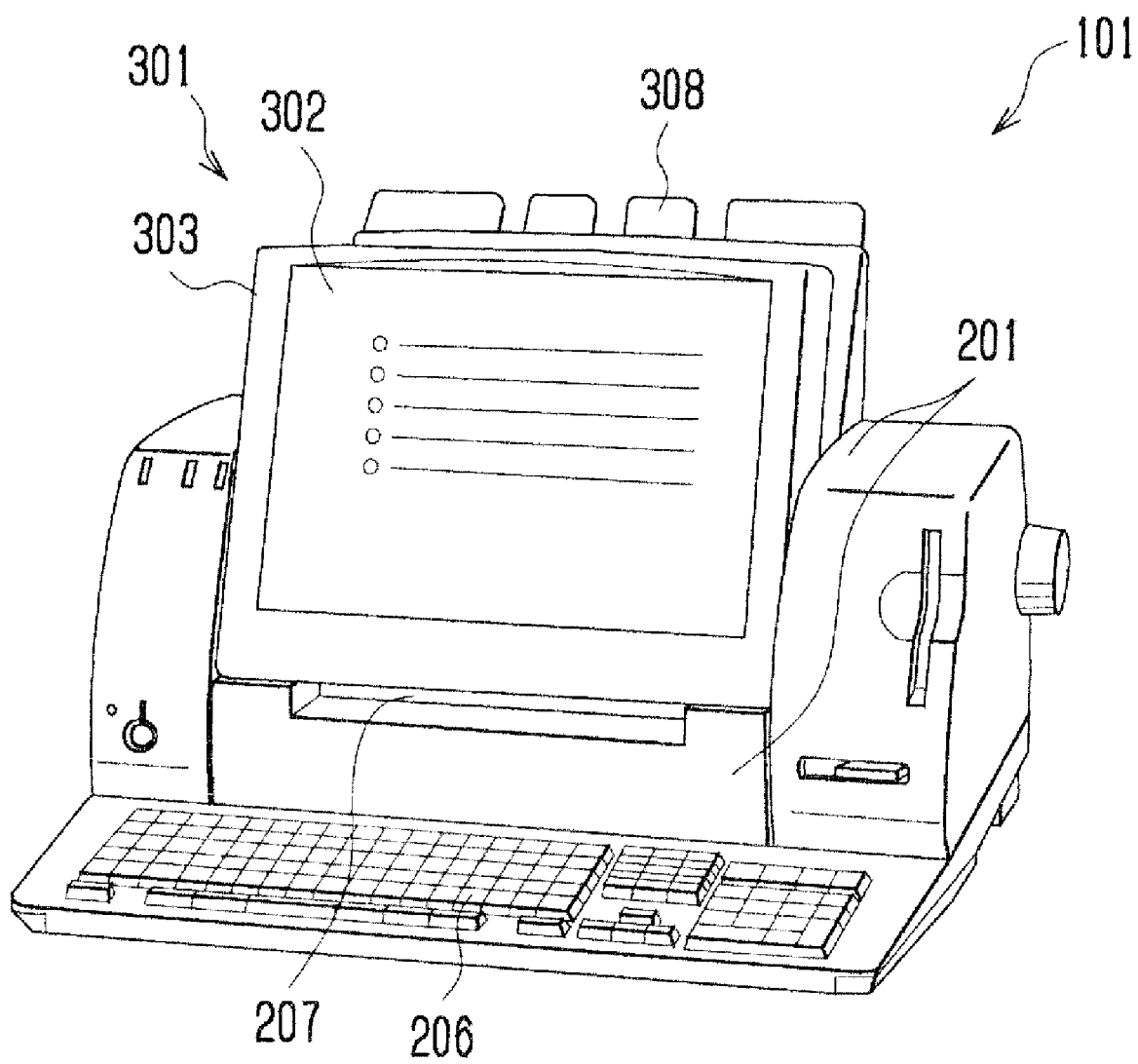
FIG. 1 is a perspective view showing an embodiment of a display device of the present invention applied to a business machine.

FIG. 1 is a perspective view showing a display device as the first embodiment of the present invention, which is applied to a business machine 101. The business machine 101 provides a main body housing 201 for storing or holding each part of the business machine 101. A display body housing 303 is provided so as to be sandwiched by both side parts of the main body housing 201 at a front surface side of the main body housing 201 (at the front side of FIG. 1). A plane display surface 302 for displaying information such as a letter, an image, and so on, at a front surface side of the display body housing 303. The display surface 302 is a LCD (Liquid Crystal Display) panel having a touch panel function allowing an input of information, for example. The display body housing 303 stores each part (not shown) for realizing a display function to the display surface 302. The display surface 302 and the display body housing 303 constitute a display body 301. The display body 301 is capable of tilting. Consequently, the business machine 101 has a tilt mechanism 701 (see FIG. 2)

for tilting the display body 301. At a most front surface of the main body housing 201, a keyboard 206 as an operational part for inputting information is provided. At a front surface of the main body housing 201 and at a lower position of the display body 301, a manual feed 207 is formed. The manual feed 207 is for feeding paper (a check paper, for example). A discharge outlet (not shown) is formed at a back surface side of the main body housing 201. A paper path (not shown) connecting the manual feed 207 and the discharge outlet is formed inside the main body housing 201. A paper inserted into the manual feed 207 is conveyed into a direction of the discharge outlet along the paper path by a conveying mechanism (not shown) provided inside the main body housing 201. The conveying paper is printed the information input through an operation of the keyboard 206, and so on, by a printing mechanism (not shown) provided near the discharge outlet and inside the main body housing 201, and is discharged from the discharge outlet. The discharged paper is received by a catch tray 308, which is provided at a back surface side of the main body housing 201.

Figure 2:
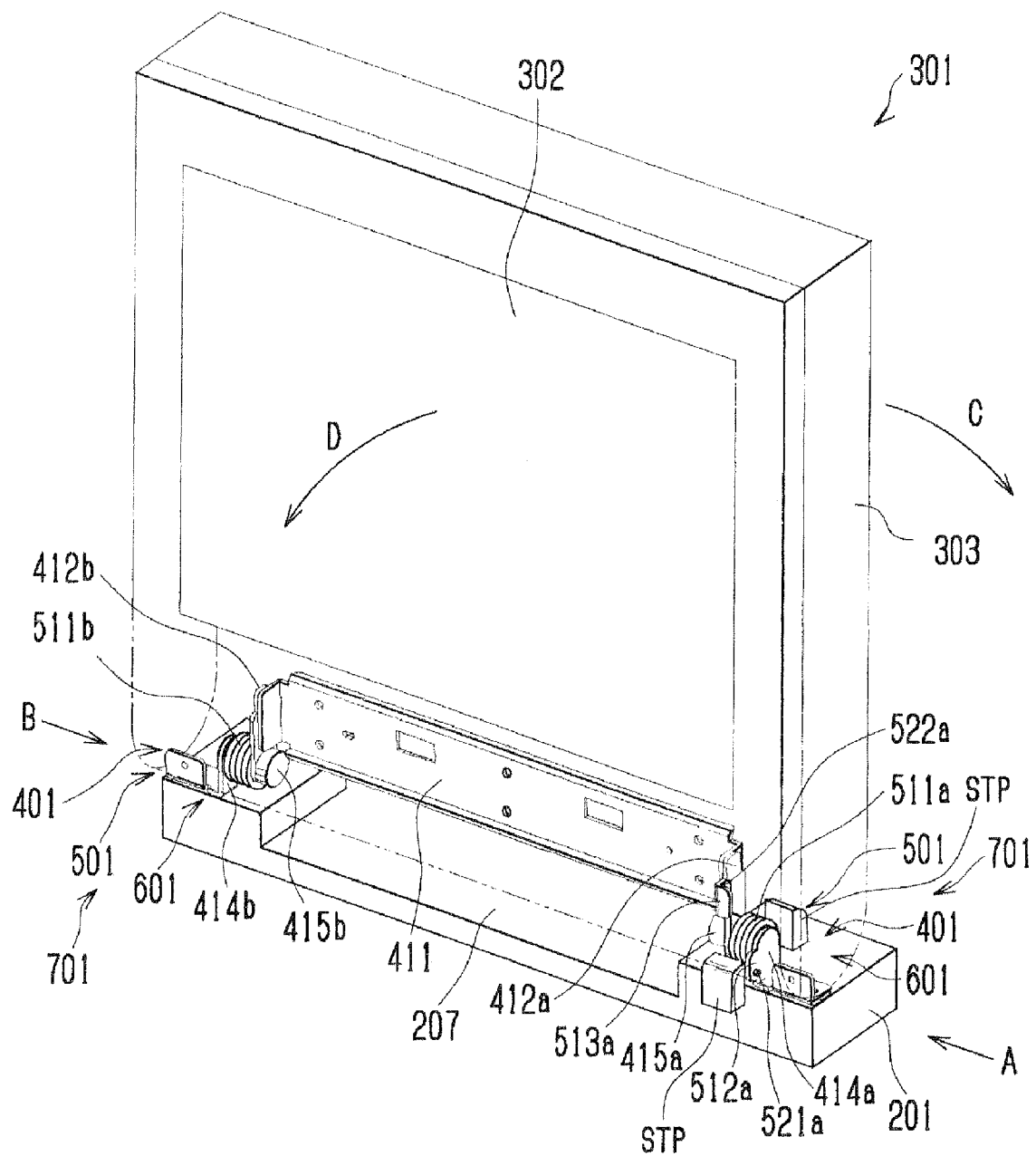
FIG. 2 is a perspective view showing a tilt mechanism.
Figure 12:
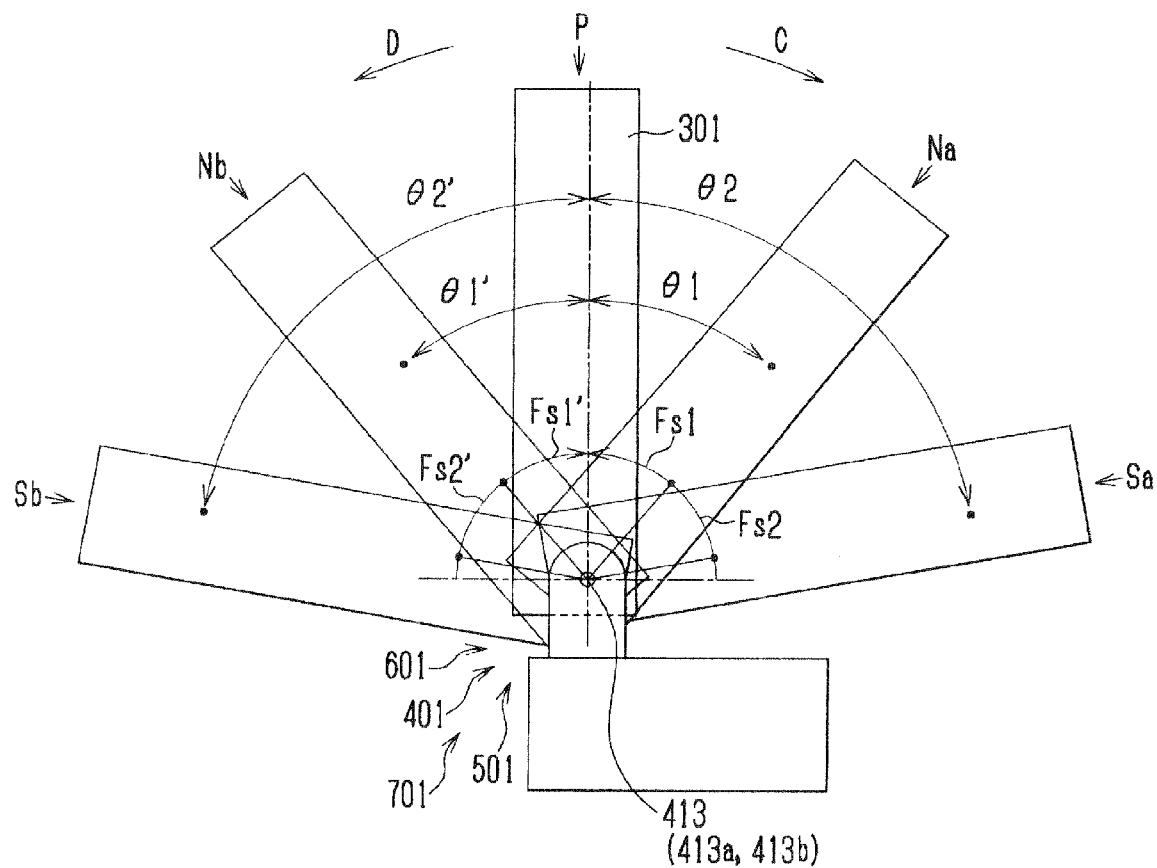
FIG. 12 is a schematic view showing the display body which moves around a supporting axis.

FIG. 2 is a perspective view showing the tilt mechanism 701. A plane fixing plate 411, which is a part of the display body 301 and is parallel with the display surface 302, is housed in a lower end part of the display body housing 303. The fixing plate 411 is fixed to the display body housing 303 by a screw (not shown). A side surface plate 412a is provided at a right side of the fixing plate 411 when seen from the display surface 302. Similarly, a side surface plate 412b is provided at a left side of the fixing plate 411 when seen from the display surface 302. The side surface plates 412a and 412b are perpendicular with respect to the fixing plate 411, respectively. A supporting axis 413a extended into a side direction is integrally provided at an outside surface of the side surface plate 412a (see FIGS. 9, 12, and so on). A supporting axis 413b extended into a side direction is integrally provided at an outside surface of the side surface plate 412b (see FIG. 12 and so on). The supporting axes 413a and 413b are concentric each other and have an axis direction parallel with the surface direction of the display surface 302. Hereinafter, the supporting axes 413a and 413b may be called as a supporting axis 413 altogether. Here, the supporting axes 413a and 413b more extend into fixing plate 411 than the side surface plates 412a and 412b do. Caps 415a and 415b covering the extended parts of the supporting axes 413a and 413b are attached at the side surface plates 412a and 412b. An axis supporter 414a is fixed to an upper surface of a right end of the manual feed 207 of the main body housing 201 when seen from the display surface 302. Similarly, an axis supporter 414b is fixed to an upper surface of a left end when seen from the display surface 302. The axis supporters 414a and 414b rotatably hold the supporting axes 413a and 413b, respectively. Therefore, the display body 301 is movably supported at the vertical position where the display surface 302 is in the vertical position as shown in FIG. 2, and at the inclined positions where the display surface 302 is in the direction of arrow C and in the direction of arrow D (FIG. 12). Here, a stopper (not shown) is provided at the main body housing 201. The stopper controls the movement of the display body 301 by contacting the display body housing 303 and locates the display body 301 at an inclined position. That is, the fixing plate 411, the side surface plates 412a and 412b, the supporting axes 413a and 413b, the axis supporters 414a and 414b, and the stopper constitute a supporting mechanism 401.

A torsion spring 511a as an elastic member is provided at a right side of the side surface plate 412a when seen from the display surface 302. Also, a torsion spring 511b is provided as an elastic member is provided at a left side of the side surface plate 412b when seen from the display surface 302. The torsion spring 511a has an arm 521a extended into a side direction and an arm 522a extended upward as its both end parts. The torsion spring 511a stores repulsive force by approximating the arms 521a and 522a to be in a closing state, and restores to an opening state by releasing the closing state. The torsion spring 511b has also a similar structure. Thereinafter, the torsion springs 511a and 511b may be called as a torsion spring 511 altogether.

Figure 3:
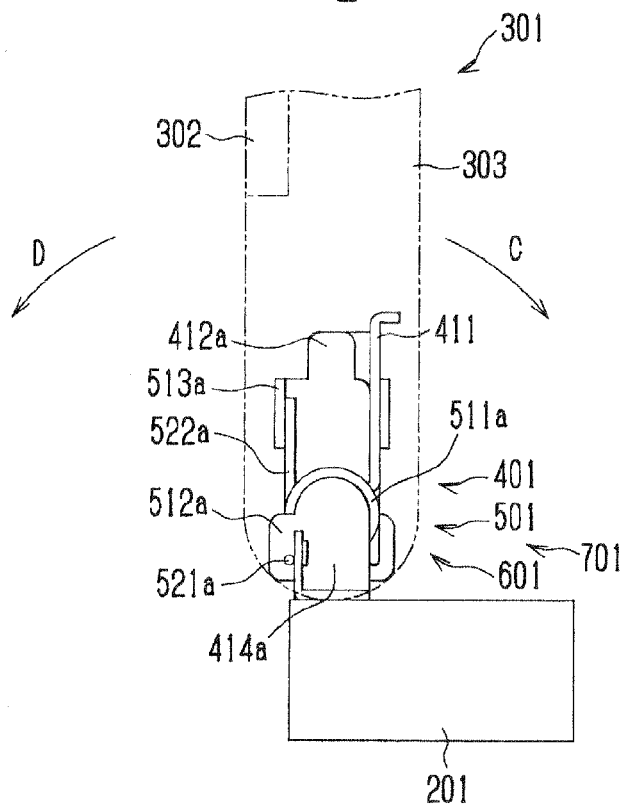
FIG. 3 is a side view of FIG. 2 seen from the direction of A.

FIG. 3 is a side view of FIG. 2 seen from the direction of A. The display body 301 is located in the vertical position. The torsion spring 511a at a right side when seen from the display surface 302's side is provided in a manner that an opening/closing axis, which is a center of its inside diameter, is concentric with the supporting axis 413a (see FIG. 9). The torsion spring 511a is provided in a manner that the arm 522a closes in the direction of arrow C. The arm 521a is held by an arm holder 512a, which is a part of the axis holder 414a. An arm pressing part 513a is provided at the display surface 302's side with respect to the side surface plate 412a. As shown in FIG. 3, when the display body 301 is in the vertical position, the art 522a comes in contact with the arm pressing part 513a.

Figure 4:
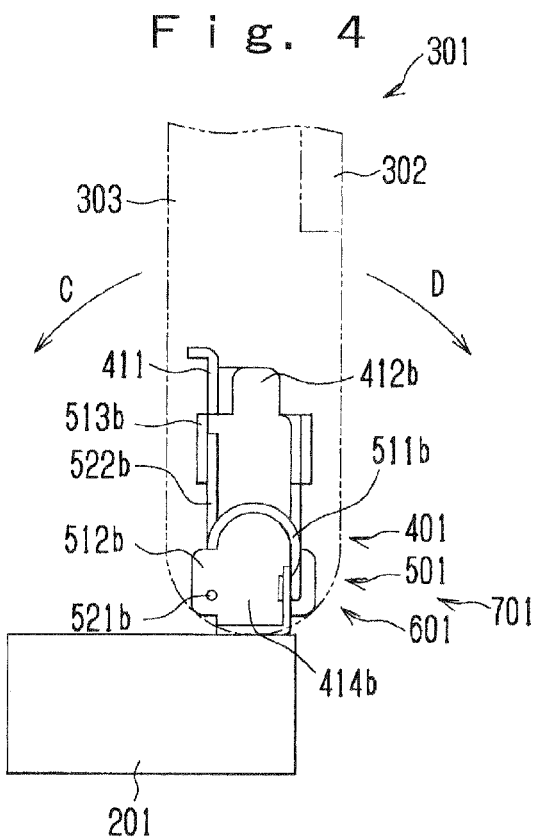
FIG. 4 is a side view of FIG. 2 seen from the direction of B.

FIG. 4 is a side view of FIG. 2 seen from the direction of B. The display body 301 is located in the vertical position. The torsion spring 511b at a left side when seen from the display surface 302's side is provided in a manner that an opening/closing axis, which is a center of an inside diameter, is concentric with the supporting axis 413b (see FIG. 9). The torsion spring 511b is provided in such a way that the arm 522b closes in a direction of arrow D. The arm 521b is held by an arm holder 512b, which is a part of the axis supporter 414b. An arm pressing part 513b is provided at a back surface side, which is opposite to the display surface 302 with respect to the side surface plate 412b. As shown in FIG. 4, when the display body 301 is located in the vertical position, the arm 522b comes in contact with the arm pressing part 513b.

Figure 5:
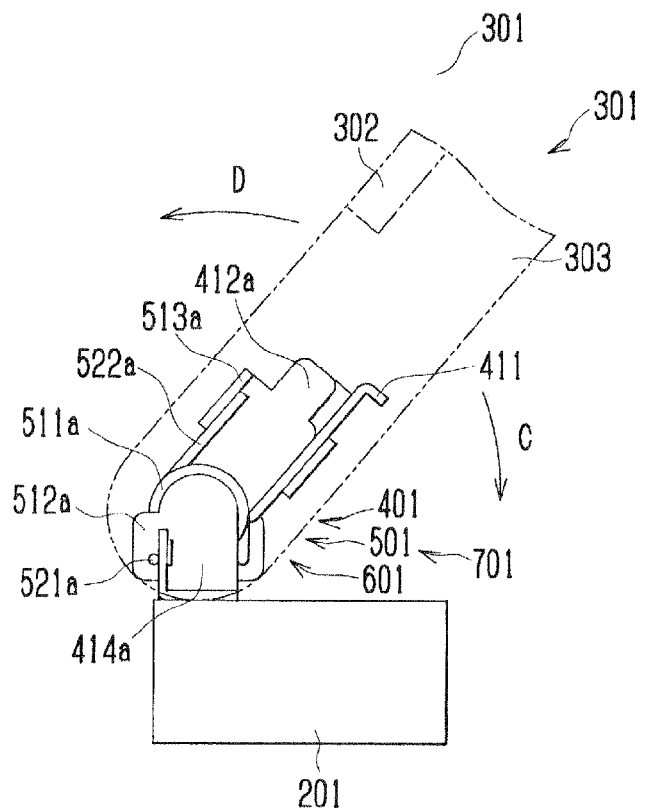
FIG. 5 is a side view of FIG. 2 seen from the direction of A in a status that a display body is moved in the direction of arrow C of FIG. 2.
Figure 6:
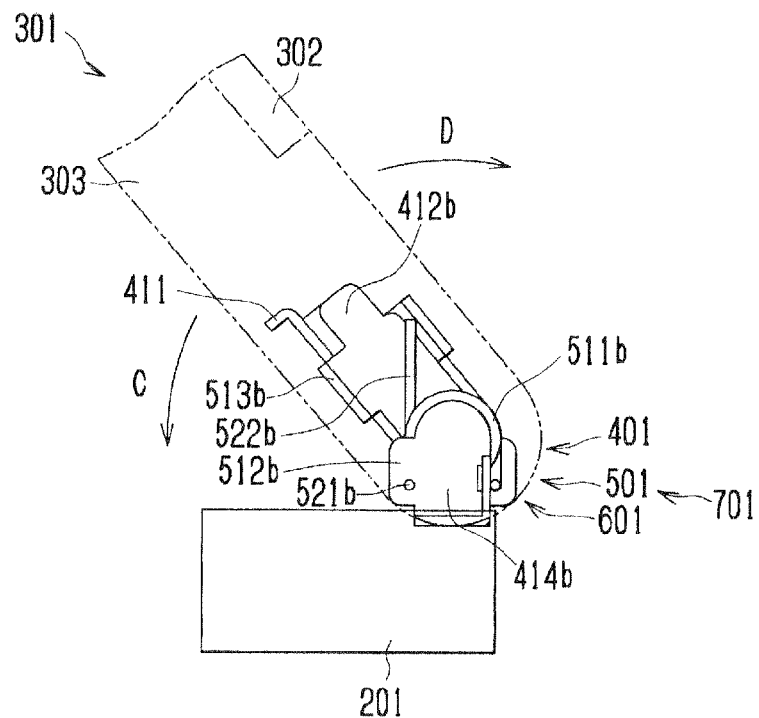
FIG. 6 is a side view of FIG. 2 seen from the direction of B in a status that a display body is moved in the direction of arrow C of FIG. 2.

FIG. 5 is a side view of FIG. 2 seen from the direction of A in a status that the display body 301 moves in the direction of arrow C in FIG. 2, and FIG. 6 is its side view seen from the direction of B. The display body 301 is located in an inclined position. As the display body 301 moves from the vertical position to the direction of arrow C, as shown in FIG. 5, the arm 522a at a right side of the torsion spring 511a when seen from the display surface 302 is pressed by the arm pressing part 513a so as to be closed in the direction of arrow C. Here, the torsion spring 511a stores repulsive force. The display body 301 is pressed in the direction from the inclined position to the vertical position by the stored repulsive force. Here, a pressing mechanism 501 is realized. At this point, as shown in FIG. 6, the contact of the arm pressing part 513a and the arm 522b is released. That is, no pressing force is applied to the arm 522b of the torsion spring 511b and the torsion spring 511b does not change its position. Therefore, the torsion spring 511b stores no repulsive force.

Figure 7:
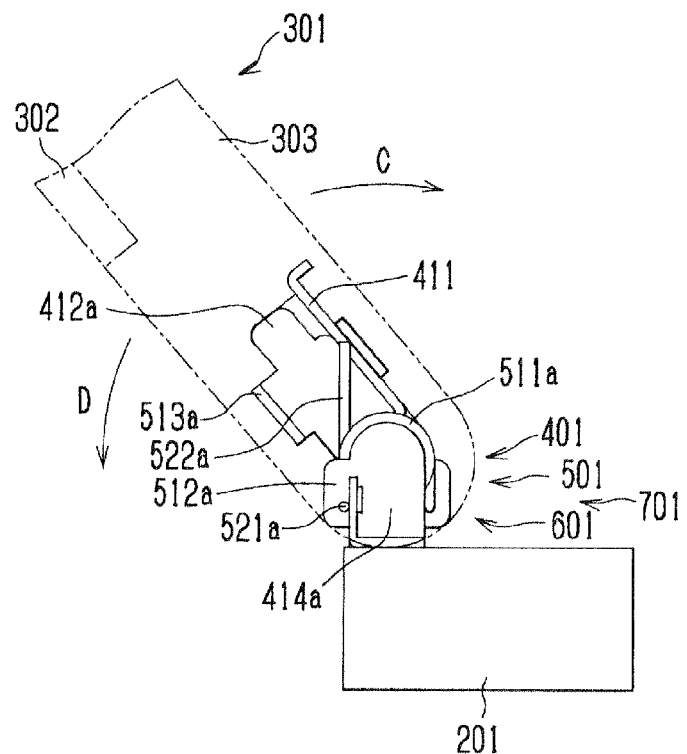
FIG. 7 is a side view of FIG. 2 seen from the direction of A in a status that a display body is moved in the direction of arrow D of FIG. 2.
Figure 8:
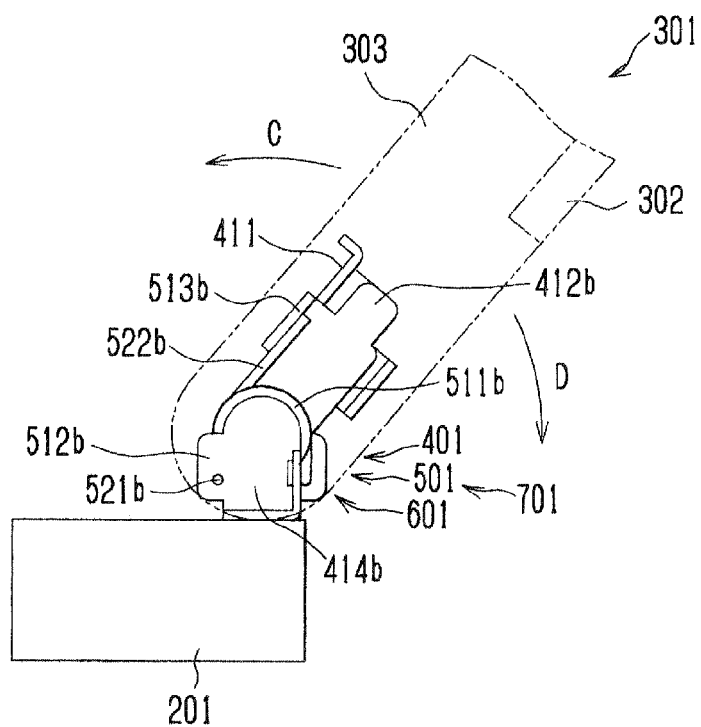
FIG. 8 is a side view of FIG. 2 seen from the direction of B in a status that a display body is moved in the direction of arrow D of FIG. 2.

FIG. 7 is a side view of FIG. 2 seen from the direction of A in a status that the display body 301 moves in the direction of arrow D in FIG. 2, and FIG. 8 is its side view seen from the direction of B. The display body 301 is located in an inclined position. As the display body 301 moves in the direction of arrow D, as shown in FIG. 7, the contact of the arm pressing part 513a and the arm 522a is released. That is, no pressing force is applied to the arm 522a of the torsion spring 511a and the torsion spring 511a does not change its position. Therefore, the torsion spring 511a stores no repulsive force. On the other hand, as shown in FIG. 8, the arm 522b at a left side of the torsion spring 511b when seen from the display surface 302 is pressed by the arm pressing part 513b so as to be closed in the direction of arrow D, and the torsion spring 511b stores repulsive force. The display body 301 is pressed from the inclined position to the vertical position by the repulsive force. Here, the pressing mechanism 501 is realized.

The display body 301 is capable of holding its position anywhere between the vertical position and the inclined position. Such position holding is realized by a position holding mechanism 601 (see FIGS. 9 to 11). The supporting mechanism 401, the pressing mechanism 501, and the position holding mechanism 601 constitute the tilt mechanism 701.

Figure 9:
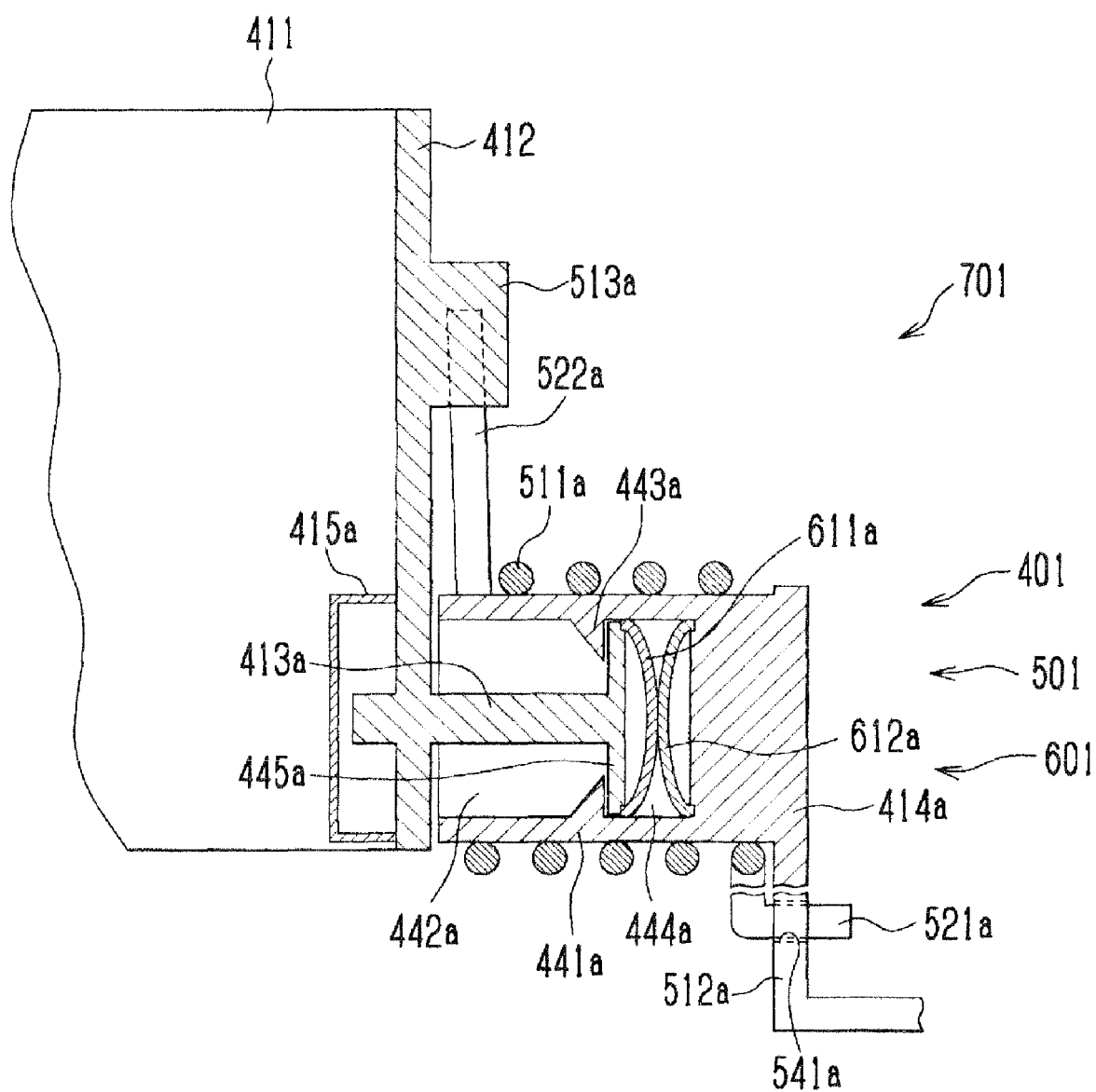
FIG. 9 is a front cross sectional view showing the tilt mechanism.

FIG. 9 is a front cross sectional view showing the tilt mechanism 701. FIG. 9 shows a tilt mechanism 701 situated at a right side only when the business machine 101 is seen at the front side (at the display surface 302's side).

The axis supporter 414a, of the supporting mechanism 401, is mainly constituted by a hollow cylinder 441a open in the direction of the fixing plate 411. A hollow part of the cylinder 441a is constituted by a first hollow part 442a at an opening side, and a second hollow part 444a partitioned with the first hollow part 442a by a valve 443a which is formed in an inside perimeter of the cylinder 441a. A disk part 445a, whose diameter is slightly smaller than the inside perimeter of the cylinder 441a (the second hollow part 444a), is integrally provided with the supporting axis 413a at a tip portion of the supporting axis 413a extended from the side surface plate 412a. The disk part 445a is housed in the second hollow part 444a. The disk part 445a is controlled its movement to the first hollow part 442a by contacting with the valve 443a. The disk 445a is pressed to the valve 443a by a first plate spring 611a and a second plate spring 612a (described later). Consequently, the supporting axis 413a is supported by the axis supporter 414a. The supporting mechanism 401 located at a left side when the business machine 101 is seen from the front side has also the similar structure.

The torsion spring 511a, which is comprised by the pressing mechanism 501, is wound around the cylinder 441a of the axis supporter 414a. The arm 522a has a direction along the winding direction of the torsion spring 511a. A tip of the arm 521a is bent in L-shape from the winding direction of the torsion spring 511a. An arm hole 541a which penetrates in the direction of the supporting axis 413a is formed at the arm holder 512a, which is a part of the supporter 414a. The L-shaped arm 521a is inserted into the arm hole 541a. Consequently, the arm 521a is held to the arm holder 512a. The pressing mechanism 501 positioned at a left side when the business machine 101 is seen from the front side has similar structure.

A position holding mechanism 601 has a first plate spring 611a curving in an arc as a first contacting member, and a second plate spring 612a curving in an arc as a second contacting member, in the second hollow part 444a. The first plate spring 611a and the second plate spring 612a have elasticity. The first plate spring 611a and the second plate spring 612a are oppositely positioned and contact each other at the curved portion. Both ends of the first plate spring 611a come in contact with the disk part 445a, which is a part of the display body 301. Both ends of the second plate spring 612a come in contact with the cylinder 441a. The second plate spring 612a presses the first plate spring 611a to the axis direction of the supporting axis 413a. By this pressing, contact friction occurs between the first plate spring 611a and the second plate spring 612a. The display body 301 is held at an optional position between the vertical position and the inclined position by the contact friction. Here, the position holding mechanism 601 is realized. A position holding mechanism 601 positioned at a left side when the business machine 101 is seen from the front side has also similar structure.

Figure 10:
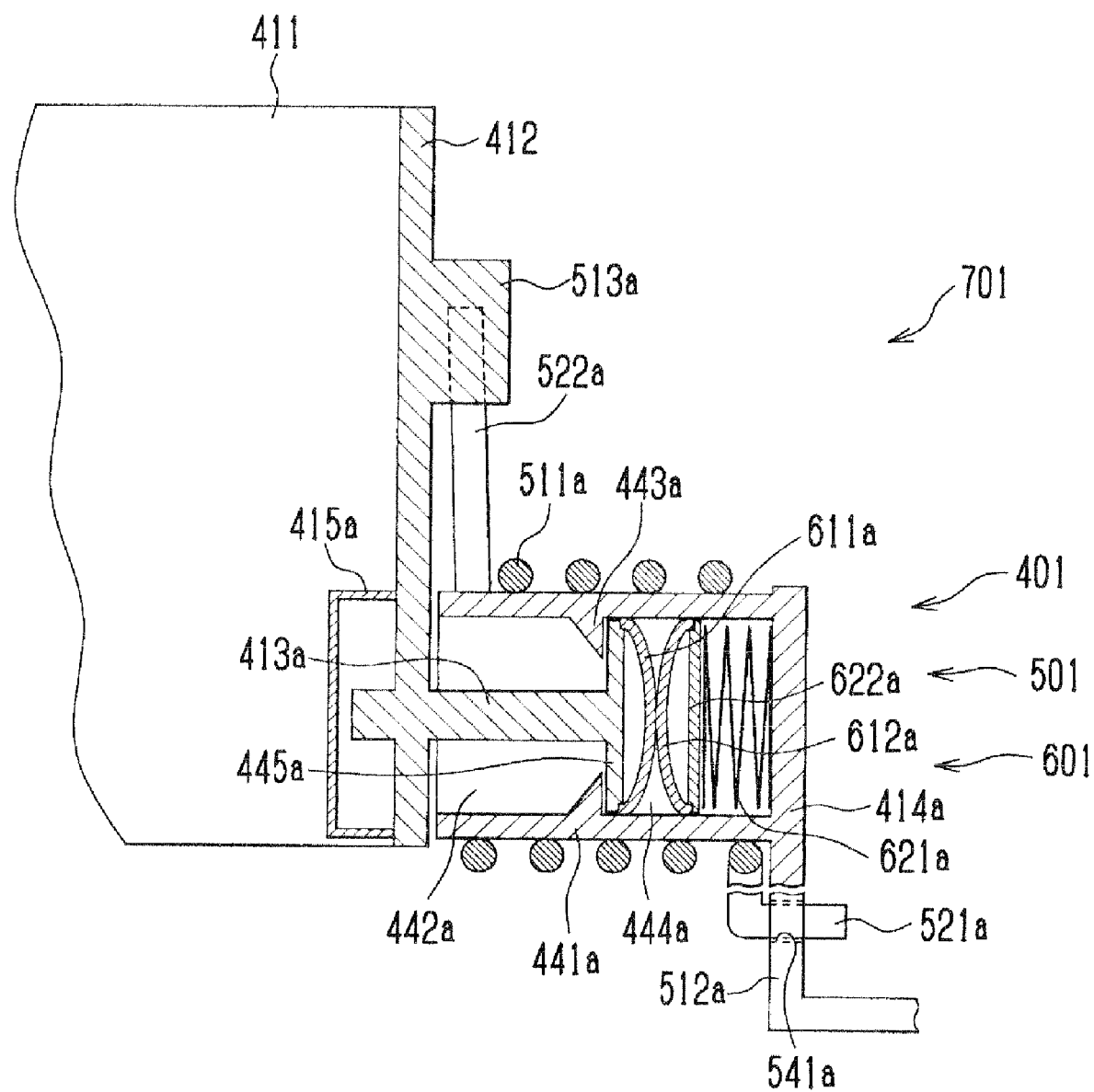
FIG. 10 is a front cross sectional view showing a tilt mechanism having another position holding mechanism.

FIG. 10 is a front cross sectional view showing a tilt mechanism 701 having another position holding mechanism 601. Reference numerals used in the tilt mechanism 701, which has been explained with reference to FIGS. 1 to 9, will be used to designate the same elements, and the overlapping explanation will be omitted. A position holding mechanism 601 in this example has a considerably different point from the position holding mechanism 601, which has been explained with reference to FIG. 9. That is, a compression spring 621a for pressing the second plate spring 612a to the first plate spring 611a is provided. A second hollow part 444a in this example exists at more the closing side than the second hollow part 444a in FIG. 9. The compression spring 621a is stretchably stored in the direction of the supporting axis 413a in the second hollow part 444a. Both ends of the second plate spring 612a come in contact with a second pressing plate 622a, the diameter of which is slightly smaller than that of the second hollow part 444a. The compression spring 621a contacts and presses the pressing plate 622a. Thereby, the second plate spring 612a is pressed to the first plate spring 611a by the compression spring 621a. By adopting such structure, contact friction generated between the first plate spring 611a and the second plate spring 612a still more increases.

Figure 11:
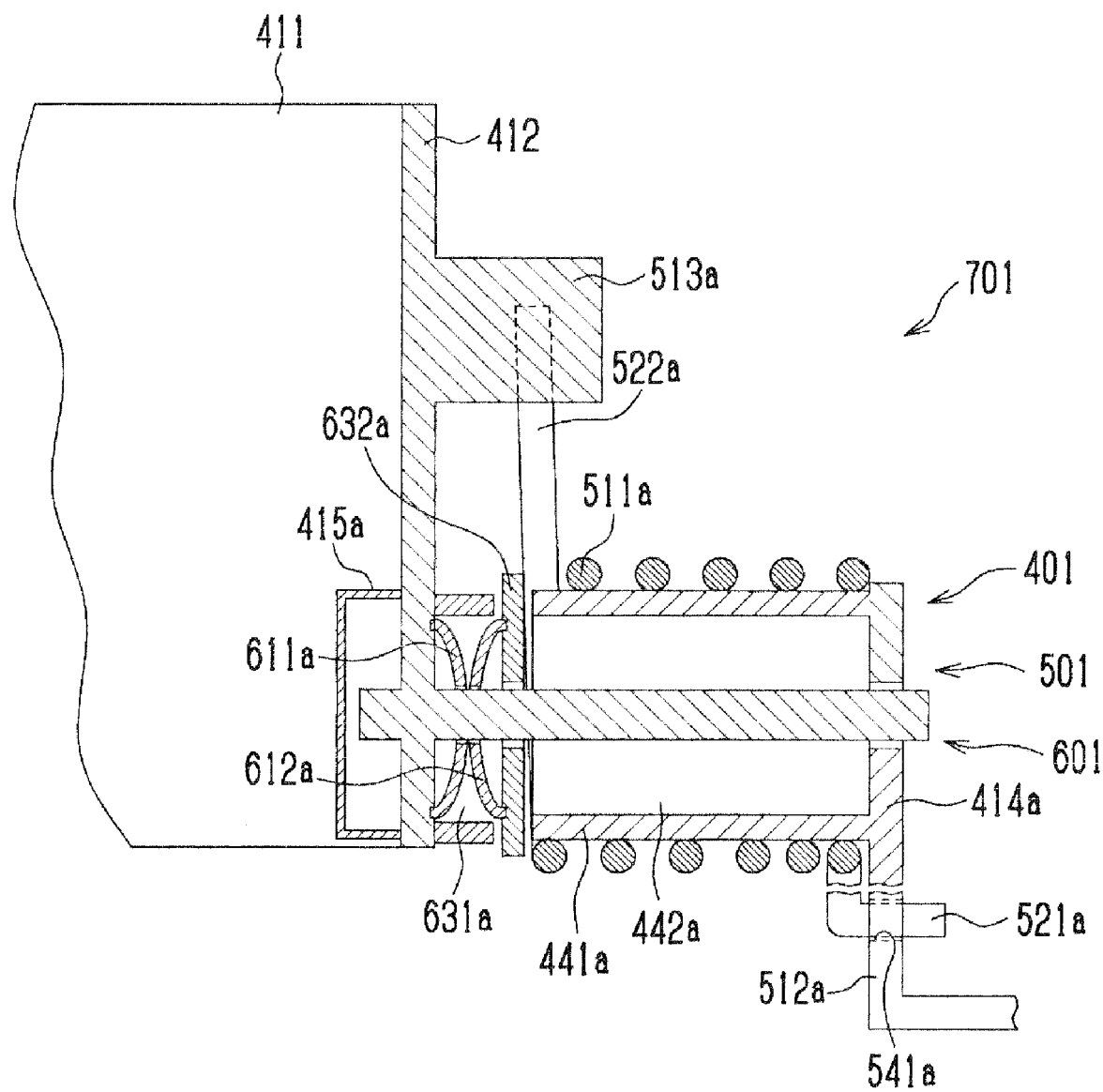
FIG. 11 is a front cross sectional view showing a tilt mechanism having still another position holding mechanism.

FIG. 11 is a front cross sectional view showing a tilt mechanism 701 having still another position holding mechanism 601. Reference numerals used in the tilt mechanism 701, which has been explained with reference to FIGS. 1 to 9, will be used to designate the same elements in this example, and the overlapping explanation will be omitted. A position holding mechanism 601 in this example has a considerable different point from the position holding mechanism 601, which has been explained with reference to FIG. 9. That is, the torsion spring 511a presses the second plate spring 612a. In this example, the disk part 445a is not provided at the tip of the supporting axis 413a. The tip of the supporting axis 413a penetrates the closing side of the cylinder 441a. A spring plate housing 631a for housing the first plate spring 611a and the second plate spring 612a is provided between the side surface plate 412a and the cylinder 441a. A partitioning plate 632a, through which the supporting axis 413a penetrates, exists between the cylinder 441a and the spring plate storage 631a. Both ends of the first plate spring 611a come in contact with the side surface plate 412a. Both ends of the second plate spring 612a come in contact with the partitioning plate 632a. The supporting axis 413a penetrates through the first plate spring 611a and the second plate spring 612a in this example stored in the spring plate storage 631a. In this example, the torsion spring 511a wound around the cylinder 441a presses the partitioning plate 632a. By this pressing, the second plate spring 612a presses the first plate spring 611a. By adopting this structure, contact friction generated between the first plate spring 611a and the second plate spring 612a still more increases.

Hereinafter, an explanation will be performed by taking the business machine 101 in FIG. 9 as an example, which has the position holding mechanism 601.

FIG. 12 is a schematic view showing the display body 301 which moves around the supporting axis 413. The display body 301 moves around the supporting axis 413 (the supporting axes 413a and 413b), and is held at an optional position.

When the display body 301 is positioned at the vertical position P, the torsion spring 511 (not shown in FIG. 12) does not have repulsive force Fs.

When the display body 301 is positioned at the position Na by moving around the supporting axis 413 from the vertical position P to the inclined position Sa (in the direction of arrow C) by an angle θ1, the torsion 511a has friction force Fs1. When the display body 301 is positioned at the inclined position Sa by moving from the vertical position P by an angle θ2, the torsion spring 511a has friction force Fs2. Here, Fs1<Fs2.

When the display body 301 is positioned at the position Nb by moving around the supporting axis 413 from the vertical position P to the inclined position Sb (in the direction of arrow D) by an angle θ1' (=θ1), the torsion spring 511b has friction force Fs1'. When the display body 301 is positioned at the inclined position Sb by moving from the vertical position P by an angle θ2' (=θ2), the torsion spring 511b has friction force Fs2'. Here, Fs1=Fs1'<Fs2=Fs2'.

The repulsive force Fs of the torsion spring 511 is represented by the following formula (A) with a spring constant K and an angle θ.

$$Fs = K \times \theta \qquad (A)$$

Figure 13:
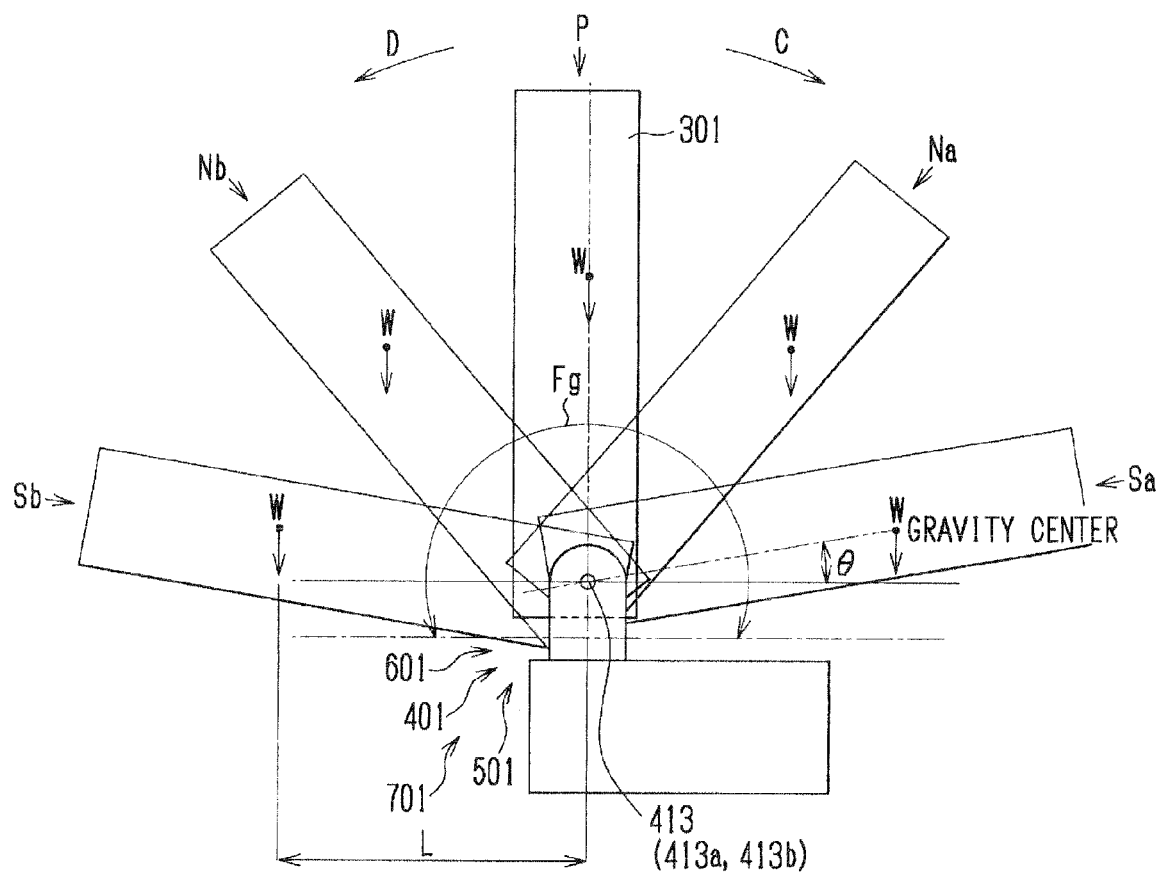
FIG. 13 is a schematic view showing the moving display body and gravity which occurs as the display body moves.

FIG. 13 is a schematic view showing the moving display body 301, and gravity W which occurs in the display body 301. The gravity W occurs in the display body 301. The gravity W is represented by the following formula (B) where mass of the display body 301 is m, and the gravity acceleration is g.

$$W = m \times g \qquad (B)$$

The display body 301 receives acting force Fg due to the gravity force W. When an angle made by a line joining the supporting axis 413 (the supporting axes 413a and 413b) and the gravity center of the display body 301, and a horizontal standard line which goes through the supporting axis 413, is an angle θ, and gravity center distance is L, which is a distance between the supporting axis 413 and the gravity center, the acting force Fg, which the display body 301 receives, is represented by the following formula (C).

$$Fg = W \times L \times \cos \theta \qquad (C)$$

That is to say, when the display body 301 is positioned at the vertical position P (cos 90°=0), the acting force Fg does not occur. On the other hand, the acting force Fg increases as the display body 301 moves (as cos 0° approaches to 1).

The repulsive force Fs (see FIG. 12) of the torsion spring 511 (not shown in FIG. 13) and the acting force Fg (see FIG. 13), which the display body 301 receives due to the gravity force, are both torque which the display body 301 receives. Since the repulsive force Fs and the acting force Fg are in the opposite direction, the forces negate each other. That is, the torque F which the display body 301 receives is represented by the following formula (D).

$$F = |Fs - Fg| = |Fs - m \times g \times L \times \cos \theta| \qquad (D)$$

Here, holding force for holding the position of the display body 301 as the tilt mechanism 701 is Fm. When the holding force, that the holding mechanism 601 holds the position of the display body 301, is Fh, the holding force Fm is represented by the following formula (E).

$$Fm = Fh - F = Fh - |Fg - Fs| \qquad (E)$$

|Fg−Fs| included in the formula (E) is calculated as absolute value because difference is absorbed by the holding force Fh of the position holding mechanism 601 irrespective of Fg<Fs or Fg>Fs. However, if it is not the case that Fh>|Fg−Fs|, the display body 301 cannot be held and moves. Therefore, it is necessary that Fh>|Fg−Fs|.

When the torque F (=|Fs−Fg|) which the display body 301 receives is zero in the formula (E), the tilt mechanism 701 holds the display body 301, and thereby the display body 301 does not move in the direction of arrow C or arrow D due to the gravity force W even though the holding force Fh of the position holding mechanism 601 is weak. More specific explanation will be described. Consider cases when F=0 (Fm=Fh-0), and F=5 (Fm=Fh-5) in the formula (E) (Fm=Fh-F). Here, as described above, it is necessary that Fh>F. Thus, a minimum required position holding force Fh of the position holding mechanism 601 is smaller in the former case than that of the latter case. That is to say, F=0 in the former case requires smaller holding force Fh of the holding mechanism 601. As a result, the holding force Fm as the tilt mechanism 701 can be smaller in the former case than in the latter case.

Here, the acting force Fg, which the display body 301 receives to due to the gravity force, is constant value which is determined by the mass m of the display body 301, and so on. Thus, by selecting an appropriate torsion spring 511 with consideration of the spring constant K, the torque F (=|Fs−Fg|), the display body 301 receives, can be zero or can be approximated to zero.

Here, the repulsive force Fs of the torsion spring 511 is represented by the following formula (F) when Fs≈Fg.

$$Fs \approx Fg = m \times g \times \cos \theta \qquad (F)$$

As explained above, even though the mass m of the display body 301 is relatively heavy as the display body 301 is getting larger, it is possible to hold the position of the display body 301 by the pressing mechanism 501, which has an appropriate torsion spring 511, without strengthening the holding force Fh of the position holding mechanism 601.

Next, a case that the display body 301 starts to move by being applied a load will be explained. When the display body 301 is reclined in the direction of arrow C, a load is applied to the display body 301 from the display surface 302's side in the direction of arrow C. For example, the load is applied by a user of the business machine 101 as he/she pushes the display body housing 303 by his/her hand. Thereby, the load as torque is applied to the position holding mechanism 601 through the display body housing 303 and the fixing plate 411 which is fixed to the display body housing 303. When the torque applied to the position holding mechanism 601 is smaller than the holding force Fm, the display body 301 does not start to move. On the other hand, when the torque is bigger than the holding force Fm of the tilt mechanism 701, the display body 301 starts to move in the direction of arrow C. Here, according to the embodiment, the holding force Fm is small since an appropriate torsion spring 511 having the repulsive force Fs as to F=0 is applied, and it is possible that the display body 301 can be moved by a relatively small load. As is similar to the case when the display body 301 is inclined in the direction of arrow D (see FIG. 2).

When the load applied to the display body 301 is smaller than the holding force Fm of the tilt mechanism 701 as the user of the business machine 101 releases his/her hand from the display body housing 303, the display body 301 stops to move and holds its position.

A second embodiment of the present invention will be explained with reference to FIGS. 14 to 16. Numeric references used in the first embodiment based on FIGS. 1 to 13 will be used in FIGS. 14 to 16 to designate the same elements, and the overlapping explanation will be omitted. A different point in the second embodiment from the first embodiment is that the pressing mechanism 501 comprises a plate spring 551 (plate springs 511*a* and 511*b*) as an elastic member instead of the torsion spring 511.

Figure 14:
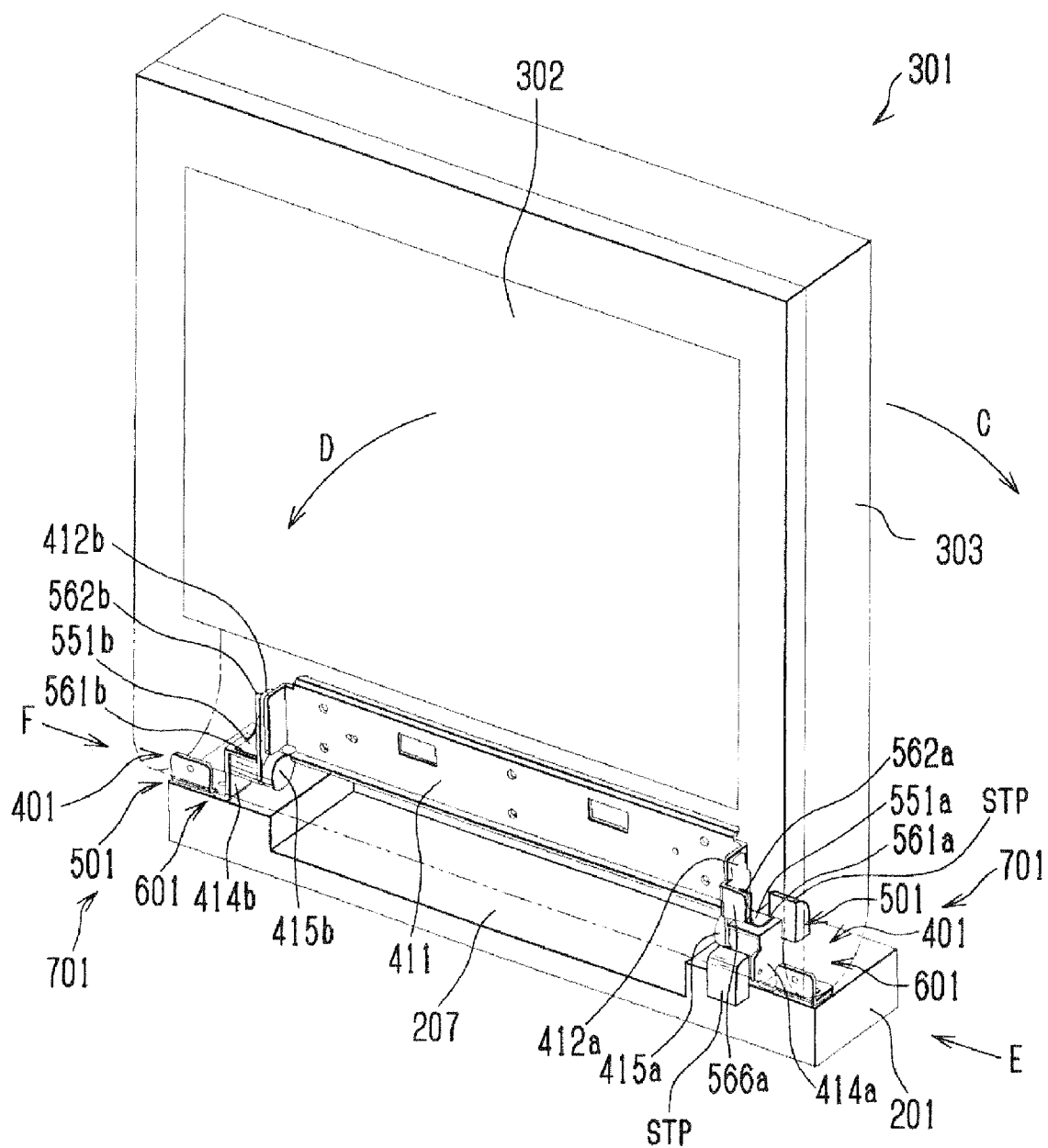
FIG. 14 is a perspective view showing a tilt mechanism of a second embodiment.

FIG. 14 is a perspective view showing a tilt mechanism 701 of the second embodiment. The plate spring 551*a* is provided at a right side of the fixing plate 411 and a side part of the side surface plate 412*a* when seen from the display surface 302. The plate spring 551*b* is provided at a left side of the fixing part 411 and a side part of the side surface plate 412*b* when seen from the display surface 302. The plate spring 551*a* has a plate spring end 561*a* and a plate spring end 562*a* as its both ends. The plate spring 551*a* stores repulsive force by approximating the plate spring end 561*a* and the plate spring end 562*a* to be in a closing state, and the plate spring 551*a* is restored to an opening state by releasing the closing state. The plate spring 551*b* has similar condition to the plate spring 551*a*.

Figure 15:
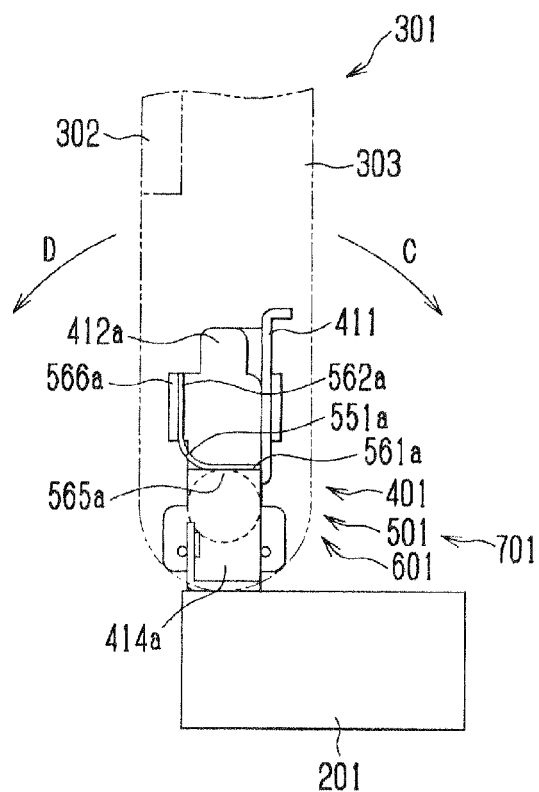
FIG. 15 is a side view seen from the direction of E of FIG. 14.

FIG. 15 is a side view of FIG. 14 seen from the direction of E. An opening/closing center of the plate spring 551*a* at a right side when seen from the display surface 302 is provided parallel with the supporting axis 413*a*. The plate spring 551*a* is provided in such a way that the plate spring end 562*a* closes in the direction of arrow C. The plate spring end 561*a* is held by a fixing member (not shown) to the plate spring holder 565*a* as a part of the axis supporter 414*a*. The plate spring pressing part 566*a* is provided at the display surface 302's side with respect to the side surface plate 412*a*. As shown in FIG. 15, when the display body 301 is positioned in the vertical position, the plate spring end 562*a* and the plate spring pressing part 566*a* come in contact each other.

Figure 16:
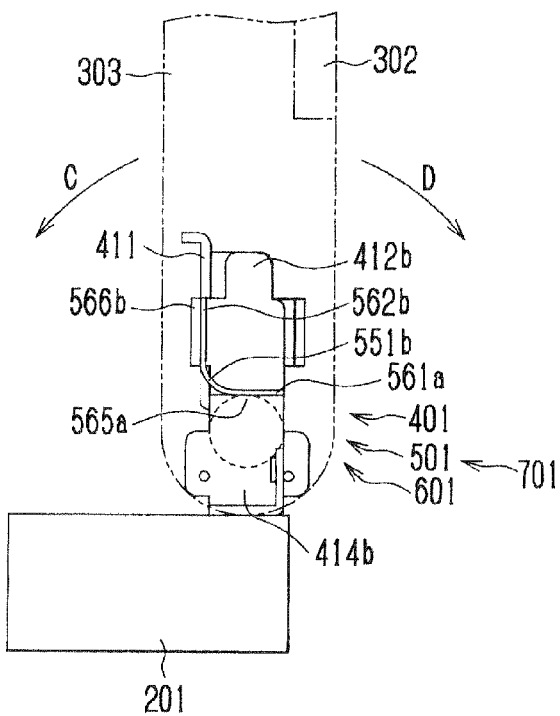
FIG. 16 is a side view seen from the direction of F of FIG. 14.

FIG. 16 is a side view of FIG. 14 seen from the direction of F. An opening/closing center of the plate spring 551*b* at a left side when seen from the display surface 302 is provided parallel with the supporting axis 413*b*. The plate spring 551*b* is provided in such a way that the plate end part 562*b* closes in the direction of D. The plate spring end 561*b* is held by a fixing member (not shown) to the plate spring holder 565*b* which is a part of the axis supporter 414*b*. The plate spring pressing part 566*b* is provided at an opposite back surface to the display surface 302 with respect to the side surface plate 412*b*. As shown in FIG. 16, when the display body 301 is in the vertical position, the plate spring end 562*b* and the plate spring pressing part 566*b* come in contact each other.

The plate spring 551*a* stores repulsive force as the display body 301 moves in the direction of arrow C and thereby the plate spring end 562*a* of the plate spring 551*a* at a right side when seen from the display surface 302 is pressed by the plate spring pressing part 566*a* to close in the direction of arrow C. The display body 301 is pressed in the vertical direction by the stored repulsive force. Here, the pressing mechanism 501 is realized. At this time, the contact between the plate spring pressing part 566*b* and the plate spring end 562*b* is released. That is, the repulsive force is not stored to the plate spring 551*b*.

Also, the plate spring end 562*b* of the plate spring 551*b* at a right side when seen from the display surface 302's side is pressed to the plate spring pressing part 566*b* to close in the direction of arrow D as the display body 301 moves in the direction of arrow D. Here, the plate spring 551*b* stores repulsive force. The display body 301 is pressed in the vertical position by the stored repulsive force. Here, the pressing mechanism 501 is realized. At this time, the contact between the plate spring pressing part 566*a* and the plate spring end 562*a* is released. That is, no repulsive force is not stored to the plate spring 551*a*.

With the structure as described above, when the display body 301 is started to move, the tilt mechanism 701 is required to have stronger load than the holding force for holding the display body 301. At this time, the holding force of the tilt mechanism 701 can be small and the display body 301 is movable by a relatively small load as the pressing mechanism 501 has the plate spring 551 which has an appropriate repulsive force. That is, according to the second embodiment of the present invention, it is possible that the display body 301 can be started to move by a relatively small load.

A third embodiment of the present invention will be explained with reference to FIGS. 17 to 19. Numeral references used in the first embodiment based on the FIGS. 1 to 13 will be used to designate the same elements, and the overlapping explanation will be omitted. A different point in the third embodiment from the other embodiments is that the pressing mechanism 501 provides a torsion bar spring 581 (torsion bar springs 581*a* and 581*b*) as an elastic member.

Figure 17:
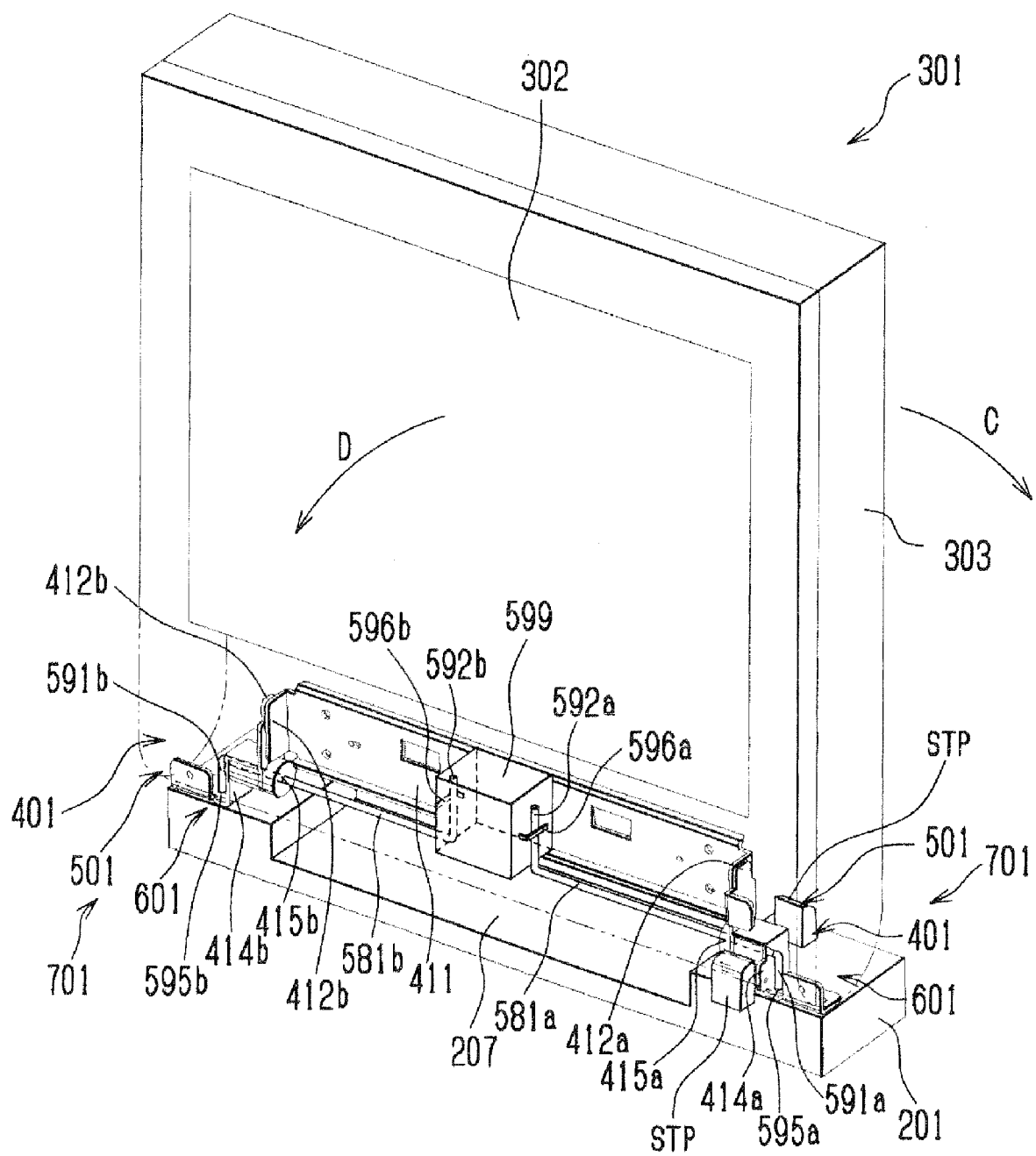
FIG. 17 is a perspective view showing a tilt mechanism of a third embodiment.

FIG. 17 is a perspective view showing a tilt mechanism 701 of the third embodiment. The torsion bar spring 581*a* is provided at a right side and the torsion bar spring 581*b* is provided at a left side of the fixing plate 411 when seen from the display surface 302's side. In this embodiment, the torsion bar springs 581*a* and 581*b* penetrate through the side surface plates 412*a* and 412*b*, the caps 415*a* and 415*b*, and the axis supporters 414*a* and 414*b*, respectively. The torsion bar spring 581 plays a role of the supporting axis 413 in the other embodiments. Therefore, the torsion bar spring 581 and the supporting axis 413 are concentric each other. Both ends of the torsion bar spring 581*a* are tips 591*a* and 592*a*, which bend in a right angle with respect to the main body. The tips 591*a* and 592*a* face in the opposite direction. The torsion bar spring 581*a* stores repulsive force by twisting the tips 591*a* and 592*a* to be in a twisted state. By releasing the twisted state, the torsion bar spring 581*a* is restored to a straight state. The tip 591*a* is held by a bar holder 595*a* which is a part of the axis supporter 414*a*, The torsion bar spring 581*b* has also the same structure as the torsion bar spring 581*a*, and the tip 591*b* of the torsion bar spring 581*b* is held by a bar holder 595*b* which is a part of the axis supporter 414*b*.

A block body 599 is fixed to a central part of the fixing plate 411. A bar pressing part 596*a* is provided at a right side of the block body 599 and a bar pressing part 596*b* is provided at a left side of the block body 599 when seen from the display surface 302.

Figure 18:
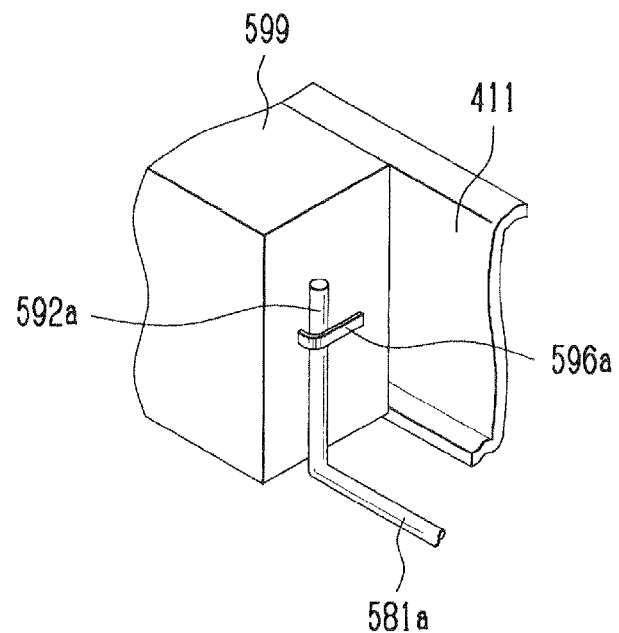
FIG. 18 is a perspective view showing a block body seen from one side.

FIG. 18 is a perspective view showing the block body 599 seen from one side. The bar pressing part 596*a* provided at one side of the block body 599 is in L-shape opening in the direction of arrow C (see FIG. 17). When the display body 301 is positioned in the vertical position, the tip 592*a* and the bar pressing part 596*a* come in contact each other. The torsion bar spring 581*a* stores repulsive force as the display body 301 moves in the direction of arrow C so that the tip 592*a* is pressed by the bar pressing part 596*a* and is twisted in the direction of arrow C. Here, the pressing mechanism 501 is realized. At this time, the tip 592*b* is released from the bar pressing part 596*b*. That is, no repulsive force is stored to the torsion bar spring 581*b*.

Figure 19:
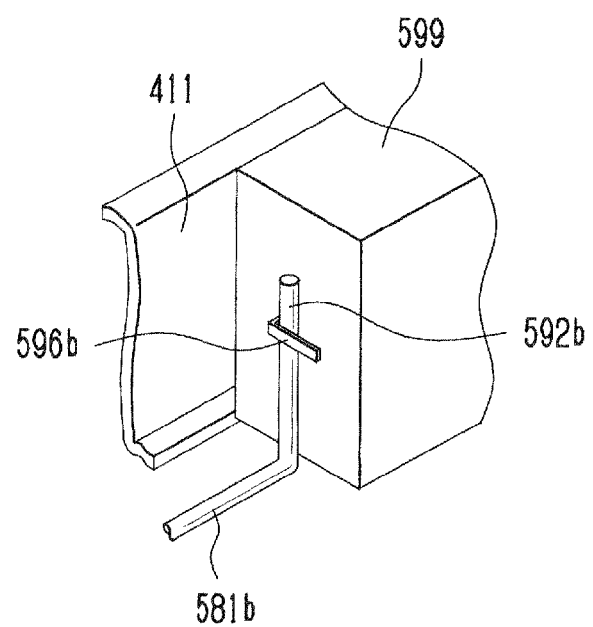
FIG. 19 is a perspective view showing the block body seen from the other side.

FIG. 19 is a perspective view showing the block body 599 seen from the other side. The bar pressing part 596*b* provided at the other side of the block body 599 is in L-shape opening in the direction of arrow D (see FIG. 17). When the display body 301 is positioned in the vertical direction, the tip 592*b* and the bar pressing part 596*b* come in contact each other. As the display body 301 moves in the direction of arrow D, the tip 592*b* is pressed by the bar pressing part 596*b* and is twisted in the direction of arrow D so that the torsion bar spring 581*b* stores repulsive force. The display body 301 is pressed in the vertical direction by the stored repulsive force. Here, the pressing mechanism 501 is realized. At this time, the tip 592a is released from the bar pressing part 596a. That is, no repulsive force is stored to the torsion bar spring 581a.

According to the structure as described above, when the display body 301 is started to move, the tilt mechanism 701 is required to have a stronger load than the holding force for holding the display body 301. At this time, it is possible that the holding force of the tilt mechanism 701 can be small and the display body 301 is movable by a relatively small load as the pressing mechanism 501 has the torsion bar spring 581 which has an appropriate repulsive force. That is, according to the third embodiment of the present invention, it is possible that the display body 301 can be started to move with a relatively small load.

Obviously, numerous modifications and variations of the present invention are possible in light of the above teachings. It is therefore to be understood that within the scope of the appended claims, the invention may be practiced otherwise than as specifically described herein.

What is claimed is:

1. A display device, comprising:
   a display body having a display surface which displays information, at one surface side, the display body being attached to a main body;
   a supporting mechanism including a supporting axis provided to a lower portion of the display body and a cylinder provided to the main body to support the supporting axis rotatably inside the cylinder, wherein the supporting mechanism supports the display body to be movable between a vertical position at which the display surface is vertical and an inclined position at which the display surface is inclined;
   a pressing mechanism comprising an elastic member for storing repulsive force by being pressed by the display body as the display body moves from the vertical position to the inclined position, wherein the elastic member presses the display body in a direction from the inclined position to the vertical position via the repulsive force; and
   a position holding mechanism comprising a first contact member provided in the cylinder on the supporting axis and a second contact member provided in the cylinder for pressing the first contact member in an axis direction of the supporting axis, wherein the position holding mechanism holds the display body at an optional position, of the vertical position and the inclined position, by contact friction generated between the first contact member and the second contact member due to the pressing by the second contact member to the first contact member,
   wherein the elastic member comprises a torsion spring, whose opening/closing center of two arms thereof is provided concentric with the supporting axis, and
   wherein the pressing mechanism comprises:
      an arm holder for holding one of the arms; and
      an arm pressing part, which is a part of the display body, and which presses the other arm to be closed as the display body moves from the vertical position to the inclined position so that the torsion spring stores repulsive force.

2. The display device of claim 1, wherein at least one of the first contact member and the second contact member is an elastic member.

3. The display device of claim 2, wherein the inclined position includes a position in which the display body inclines toward a display surface side and a position in which the display body inclines toward a side opposite the display surface side.

4. The display device of claim 1, wherein the inclined position includes a position in which the display body inclines toward a display surface side and a position in which the display body inclines toward a side opposite the display surface side.

5. A display device, comprising:
   a display body having a display surface which displays information, at one surface side, the display body being attached to a main body;
   a supporting mechanism including a supporting axis provided to a lower portion of the display body and a cylinder provided to the main body to support the supporting axis rotatably inside the cylinder, wherein the supporting mechanism supports the display body to be movable between a vertical position at which the display surface is vertical and an inclined position at which the display surface is inclined;
   a pressing mechanism comprising an elastic member for storing repulsive force by being pressed by the display body as the display body moves from the vertical position to the inclined position, wherein the elastic member presses the display body in a direction from the inclined position to the vertical position via the repulsive force; and
   a position holding mechanism comprising a first contact member provided in the cylinder on the supporting axis and a second contact member provided in the cylinder for pressing the first contact member in an axis direction of the supporting axis, wherein the position holding mechanism holds the display body at an optional position, of the vertical position and the inclined position, by contact friction generated between the first contact member and the second contact member due to the pressing by the second contact member to the first contact member,
   wherein the elastic member is a plate spring, whose opening/closing center of two ends thereof is provided parallel with the supporting axis, and
   wherein the pressing mechanism comprises:
      a plate spring holder for holding one of the ends; and
      a plate spring pressing part, which is a part of the display device, and which presses the other end to be closed as the display body moves from the vertical position to the inclined position so that the plate spring stores repulsive force.

6. The display device of claim 5, wherein at least one of the first contact member and the second contact member is an elastic member.

7. The display device of claim 6, wherein the inclined position includes a position in which the display body inclines toward a display surface side and a position in which the display body inclines toward a side opposite the display surface side.

8. The display device of claim 5, wherein the inclined position includes a position in which the display body inclines toward a display surface side and a position in which the display body inclines toward a side opposite the display surface side.

9. A display device, comprising:
   a display body having a display surface which displays information, at one surface side, the display body being attached to a main body;
   a supporting mechanism including a supporting axis provided to a lower portion of the display body and a cylinder provided to the main body to support the supporting axis rotatable inside the cylinder, wherein the supporting mechanism supports the display body to be movable between a vertical position at which the display surface is vertical and an inclined position at which the display surface is inclined;

a pressing mechanism comprising an elastic member for storing repulsive force by being pressed by the display body as the display body moves from the vertical position to the inclined position, wherein the elastic member presses the display body in a direction from the inclined position to the vertical position via the repulsive force; and a position holding mechanism comprising a first contact member provided in the cylinder on the supporting axis and a second contact member provided in the cylinder for pressing the first contact member in an axis direction of the supporting axis, wherein the position holding mechanism holds the display body at an optional position, of the vertical position and the inclined position, by contact friction generated between the first contact member and the second contact member due to the pressing by the second contact member to the first contact member, wherein the elastic member is a torsion bar spring, which is provided concentric with the supporting axis, and two tips thereof of which restores from a twisted state to a straight state, and wherein the pressing mechanism comprises:
a bar holder for holding one of the tips; and
a bar pressing part, which is a part of the display body, and which presses the other tip to be twisted as the display body moves from the vertical position to the inclined position so that the torsion bar spring stores repulsive force.

10. The display device of claim 9, wherein at least one of the first contact member and the second contact member is an elastic member.

11. The display device of claim 10, wherein the inclined position includes a position in which the display body inclines toward a display surface side and a position in which the display body inclines toward a side opposite the display surface side.

12. The display device of claim 9, wherein the inclined position includes a position in which the display body inclines toward a display surface side and a position in which the display body inclines toward a side opposite the display surface side.

* * * * *